US012750416B2

(12) United States Patent
Govindaraju et al.

(10) Patent No.: US 12,750,416 B2
(45) Date of Patent: Sep. 29, 2026

(54) DISTRIBUTED COMPUTING FRAMEWORK

(71) Applicant: Apple Inc., Cupertino, CA (US)

(72) Inventors: Vishwanth Kamala Govindaraju, Mountain View, CA (US); Sriram Subramanian, San Jose, CA (US); Said Medjkouh, San Diego, CA (US); Sanjeevi Balasubramanian, San Jose, CA (US); Shiva Krishna Narra, San Jose, CA (US); Tarik Tabet, Carlsbad, CA (US); Alosious Pradeep Prabhakar, Singapore (SG); Sameh M Eldessoki, Munich (DE); Panagiotis Botsinis, Munich (DE); Milan Zivkovic, Munich (DE); Amr Abdelrahman Yousef A. Mostafa, Munich (DE); Christian Hofmann, Munich (DE)

(73) Assignee: Apple Inc., Cupertino, CA (US)

(*) Notice: Subject to any disclaimer, the term of this patent is extended or adjusted under 35 U.S.C. 154(b) by 592 days.

(21) Appl. No.: 18/330,705

(22) Filed: Jun. 7, 2023

(65) Prior Publication Data

US 2024/0414222 A1 Dec. 12, 2024

(51) Int. Cl.

*H04L 67/10* (2022.01)
*H04W 60/04* (2009.01)
*H04W 60/06* (2009.01)

(52) U.S. Cl.

CPC ............ *H04L 67/10* (2013.01); *H04W 60/04* (2013.01); *H04W 60/06* (2013.01)

(58) Field of Classification Search

None

See application file for complete search history.

(56) References Cited

U.S. PATENT DOCUMENTS

| | | | | |
|---|---|---|---|---|
| 11,363,113 | B1 * | 6/2022 | Edwards | H04L 67/288 |
| 11,711,779 | B2 * | 7/2023 | Kumar | H04W 60/04 370/329 |
| 2009/0213834 | A1 * | 8/2009 | Amirijoo | H04W 60/00 370/352 |

(Continued)

*Primary Examiner* — Mahran Y Abu Roumi

(74) *Attorney, Agent, or Firm* — Eschweiler & Potashnik, LLC; Ningjiao Zhang

(57) ABSTRACT

Systems, methods, and processors are provided for supporting a distributed computing framework. In one example, a wireless communication device is configured to act as a distributed computing control node (ContN), the wireless communication device including a memory and a processor coupled to the memory. The processor is configured to, when executing instructions stored in the memory, cause the device to receive respective registration messages from respective wireless communication devices. The registration messages include registration information indicating whether a respective wireless communication device acts as an offload node (OffN) for distributed computing or a compute node (CompN) for distributed computing. The processor is configured to store the registration information in a resource repository and, based on the registration information of the respective wireless communication devices, transmit a resource availability message indicating available distributed computing resources to wireless communication devices acting as OffNs.

24 Claims, 12 Drawing Sheets

(56) References Cited

U.S. PATENT DOCUMENTS

| | | | | | |
|---|---|---|---|---|---|
| 2012/0173729 | A1* | 7/2012 | Lee | H04L 67/1008 | 709/228 |
| 2014/0038654 | A1* | 2/2014 | Ahmadi | H04W 72/21 | 455/517 |
| 2014/0056226 | A1* | 2/2014 | Breau | H04L 65/104 | 370/328 |
| 2015/0004901 | A1* | 1/2015 | Agiwal | H04W 76/11 | 455/39 |
| 2019/0174449 | A1* | 6/2019 | Shan | H04W 60/00 | |
| 2022/0201641 | A1* | 6/2022 | Pattnaik | H04L 67/55 | |
| 2023/0139345 | A1* | 5/2023 | Sun | H04W 28/0268 | 370/328 |
| 2023/0209441 | A1* | 6/2023 | Tiwari | H04W 8/186 | 455/435.1 |
| 2024/0267113 | A1* | 8/2024 | Dees | H04W 88/06 | |

* cited by examiner

| NODE TYPE | OffN ID | CompN ID | OffN? | CompN ? | CAPACITY | LOCATION | MOBILITY STATUS |
|---|---|---|---|---|---|---|---|
| Hosted Node | r1 | s0 | Y | Y | RAM: 128GB<br>CPU: 2 GHZ<br>GPU: 10 GB | a | STATIONARY |
| UE | r2 | s1 | Y | Y | RAM: 128GB<br>CPU: 2 GHZ<br>GPU: 10 GB | b | MOBILE |
| Server (Owner) | xxxx | s2 | N | Y | RAM: 256GB<br>CPU: 2 GHZ<br>GPU: 40 GB | c | STATIONARY |
| RAN Node | xxxx | s3 | N | Y | RAM: 256 GB<br>CPU: 2 GHZ<br>GPU: 40 GB | d | STATIONARY |
| UE | r4 | xxxx | Y | N | xxxx | e | MOBILE |

| NODE TYPE | CompN ID | OffN ID | CAPACITY | ADDRESS | AVAILABILITY | PROCESS ID | ALLOCATION |
|---|---|---|---|---|---|---|---|
| App Server | s1 | r1<br>r4 | RAM: 256 GB<br>CPU: 2 GHZ<br>GPU: 40 GB | 10.x.x.x | RAM: 0 GB<br>CPU: 0 GHZ<br>GPU: 0 GB | p1<br>p2 | RAM: 128 GB<br>CPU: 0.5 GHZ<br>GPU: 10 GB<br>RAM: 128 GB<br>CPU: 0.5 GHZ<br>GPU: 30 GB |
| Edge Server (Owner) | s3 | r7 | RAM: 256GB<br>CPU: 2 GHZ<br>GPU: 40 GB | 10.x.x.x | RAM: 128B<br>CPU: 1.5 GHZ<br>GPU: 25 GB | p5 | RAM: 128 GB<br>CPU: 1 GHZ<br>GPU: 15 GB |
| Server (Owner) | s4 | r4 | RAM: 128 GB<br>CPU: 2 GHZ<br>GPU: 10 GB | 10.x.x.x | RAM: 64 GB<br>CPU: 1 GHZ<br>GPU: 6 GB | p2 | RAM: 64 GB<br>CPU: 1 GHZ<br>GPU: 4 GB |
| Hosted Node | s5 | r2 | RAM: 128 GB<br>CPU: 2 GHZ<br>GPU: 15 GB | 10.x.x.x | RAM: 0 GB<br>CPU: 0 GHZ<br>GPU: 0 GB | p3 | RAM: 128 GB<br>CPU: 2 GHZ<br>GPU: 15 GB |

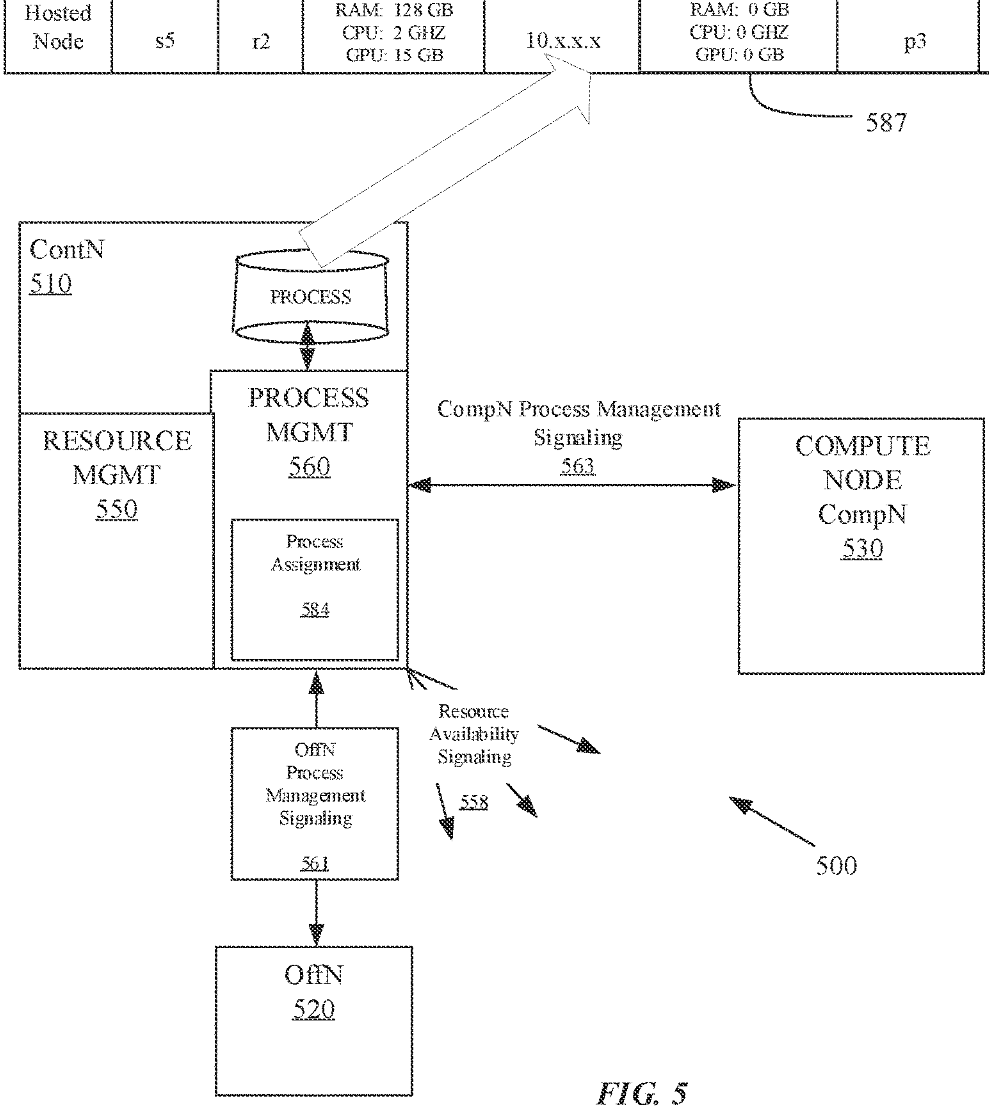

*FIG. 5*

DISTRIBUTED COMPUTING FRAMEWORK

BACKGROUND

The present disclosure relates generally to wireless communication and more specifically to techniques for supporting distributed computing amongst devices.

BRIEF DESCRIPTION OF THE DRAWINGS

Some examples of circuits, apparatuses and/or methods will be described in the following by way of example only. In this context, reference will be made to the accompanying figures.

FIG. 5 is a diagram of an example distributed computing process management function and repository, in accordance with various aspects described.

DETAILED DESCRIPTION

Figure 1:
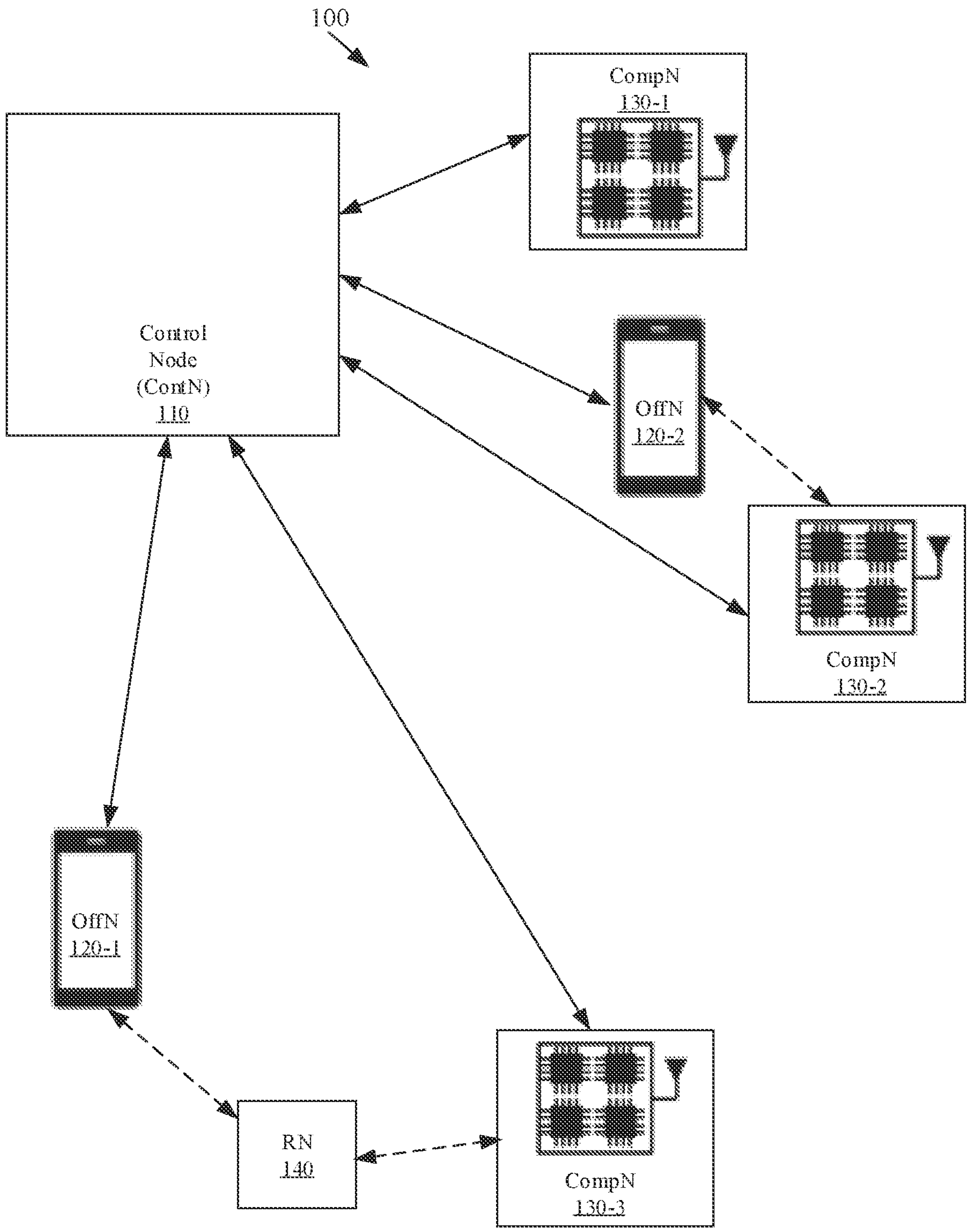
FIG. 1 is a diagram of an example wireless communication network that supports distributing computing, in accordance with various aspects described.

The present disclosure is described with reference to the attached figures. Similar components in various figures are represented by similar reference characters. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Compute-power intensive applications are becoming more commonplace on portable wireless communication devices, such as smart phones, smart watches, headsets, and so on. These devices are now expected to support federated learning, augmented reality, virtual reality, 2D and 3D rendering, telepresence, and more. These compute-power intensive applications have different requirements in terms of latency, uplink (UL) throughput, and downlink (DL) throughput. While significantly increasing the computing power of the wireless communication device itself is one option for supporting compute-power intensive applications, this will result in a corresponding increase in power consumption and reduction in battery life.

Described herein are systems, architectures, and devices that support distributed computing to enable a wireless communication device to offload compute-power intensive tasks to another network node. Distributed computing resource management and distributed computing process management functions or service layers are provided to implement a flexible framework for managing distributed computing resources and tasks.

FIG. 1 illustrates an exemplary wireless communication network 100 that supports distributing computing. The network includes a wireless communication network device acting as a control node (ContN) 110, wireless communication devices 120-1, 120-2 acting as offload nodes (OffNs), and wireless communication devices 130-1, 130-2, 130-3 acting as compute nodes (CompNs). It is noted that a wireless communication device may act as both an OffN and a CompN. In FIG. 1, flows of distributed computing control messages are indicated by solid line and flows of distributed computing data and results are indicated by dashed line. The network 100 may include one or more routing nodes (RNs), such as RN 140, that relays computing task data between an OffN and a CompN.

Within the distributed computing framework, the ContN may be implemented by a radio access network (RAN) node such as a base station or transmission reception point (TRP), a server or other device associated with a core network (CN), or a remote server (e.g., part of a cloud or a network edge server). An OffN may be implemented by a user equipment (UE) (e.g., smart phone, smart watch, wearable, headset, gaming console, and so on) operating in the RAN. In some examples, the OffN may be implemented by a RAN node, a server or other device associated with the CN, or a remote server. A CompN may be implemented by a RAN node, a server or other device associated with the CN, a remote server, or a UE operating in the RAN.

Messaging between distributed computing nodes (i.e., OffN, ContN, and CompN) is disclosed in some contexts herein without reference to a particular type of network device implementing each node. In some aspects, distributed computing control messages between a node implemented in a UE and a node implemented in the CN are routed via a RAN node to the CN. In some aspects, distributed computing control messages between a node implemented in a UE and a node implemented in a RAN node are routed via the RAN node. In some aspects, distributed computing control messages between a node implemented in a UE and a node implemented in a remote server are routed via the RAN node, the CN, to the remote server. In some aspects, distributed computing control messages between a node implemented in a RAN node and a node implemented in a remote server are routed via the RAN node, the CN, to the remote server. The information communicated by the distributed computing control messages is similar regardless of a type of wireless communication device implementing the participating distributed computing nodes, while formatting and protocol may be different.

Figure 2:
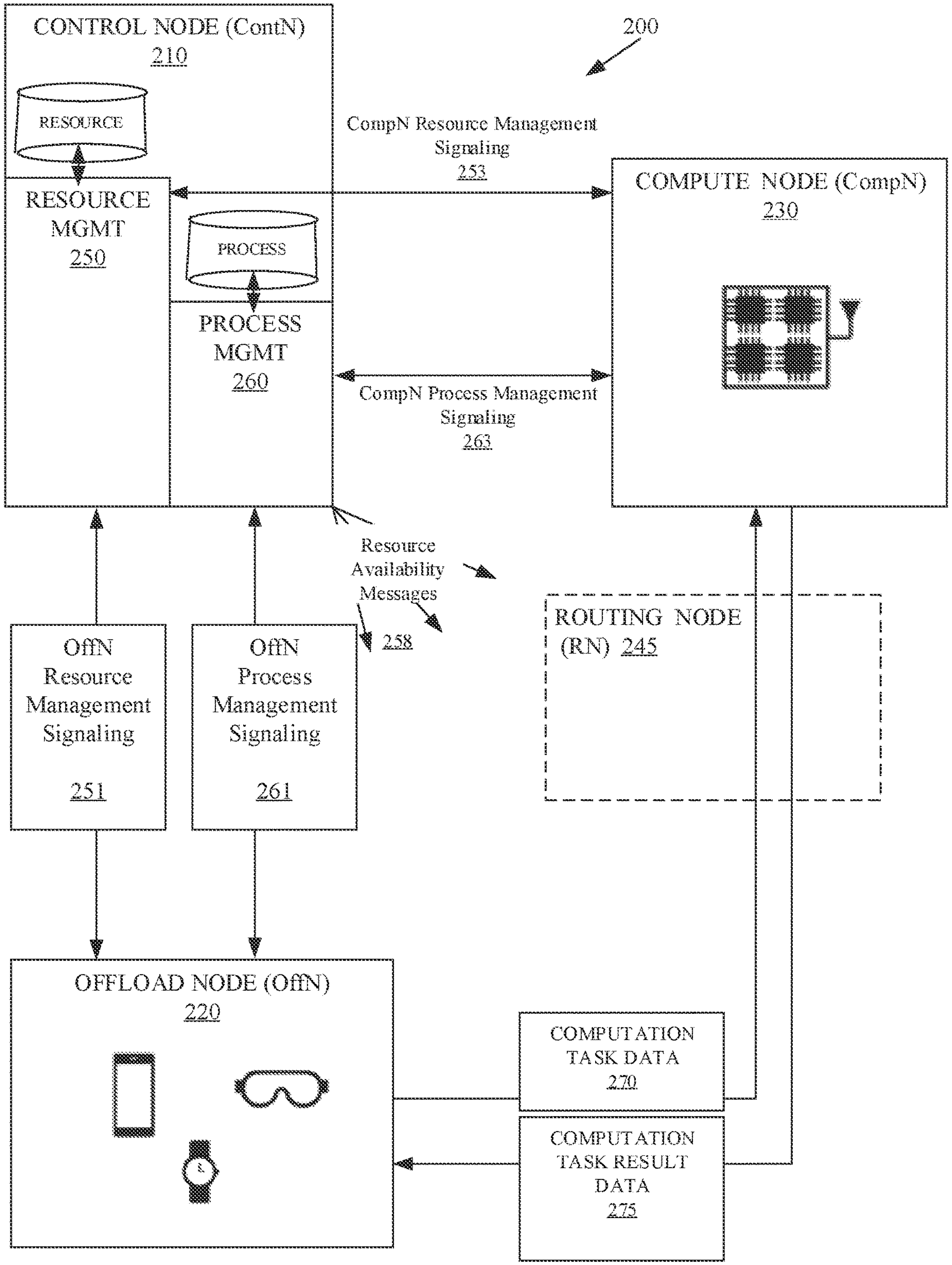
FIG. 2 is a diagram of an example wireless communication network that supports distributing computing, in accordance with various aspects described.

FIG. 2 illustrates an example communication network 200 that supports distributed computing. The network includes a ContN 210, OffN 220, and CompN 230. While only a single OffN and CompN are illustrated, in many examples, there are multiple OffNs and CompNs. The ContN 210 implements a resource management function 250 and a process management function 260. The resource management function 250 participates in OffN resource management signaling 251 and CompN resource management signaling 253 to compile and maintain a resource repository of currently available distributed computing resources.

The process management function 260 participates in OffN process management signaling 261 and CompN process management signaling 263 to compile and maintain a process repository of currently active distributed computing processes and current remaining compute resource availability, The process management function 260 receives offload requests and assigns a CompN for performing the distributed computing tasks based on available distributed computing resources. The process repository is updated as distributed computing tasks are assigned and completed by CompNs. The updating of the process repository may be performed via CompN resource management signaling 253.

The ContN 210 transmits resource availability messages 258 that advertise, to OffNs, aggregated currently available distributed computing resources. The resource availability messages 258 may be transmitted periodically, in response to an event (e.g., a change in available resources), and/or in response to a request. In some examples, the resource availability messages are transmitted using broadcast, multicast, or unicast messaging (e.g., via system information block (SIB), non-access stratum (NAS) messaging, radio resource control (RRC) container, dedicated or groupcast messaging, and so on).

Computation task data 270 is transmitted from the OffN 220 to the assigned CompN 230 and computation task result data 275 is transmitted from the CompN 230 to the OffN 220, via a RN 245 when necessary or desirable due to network conditions.

Resource Management

Figure 3:
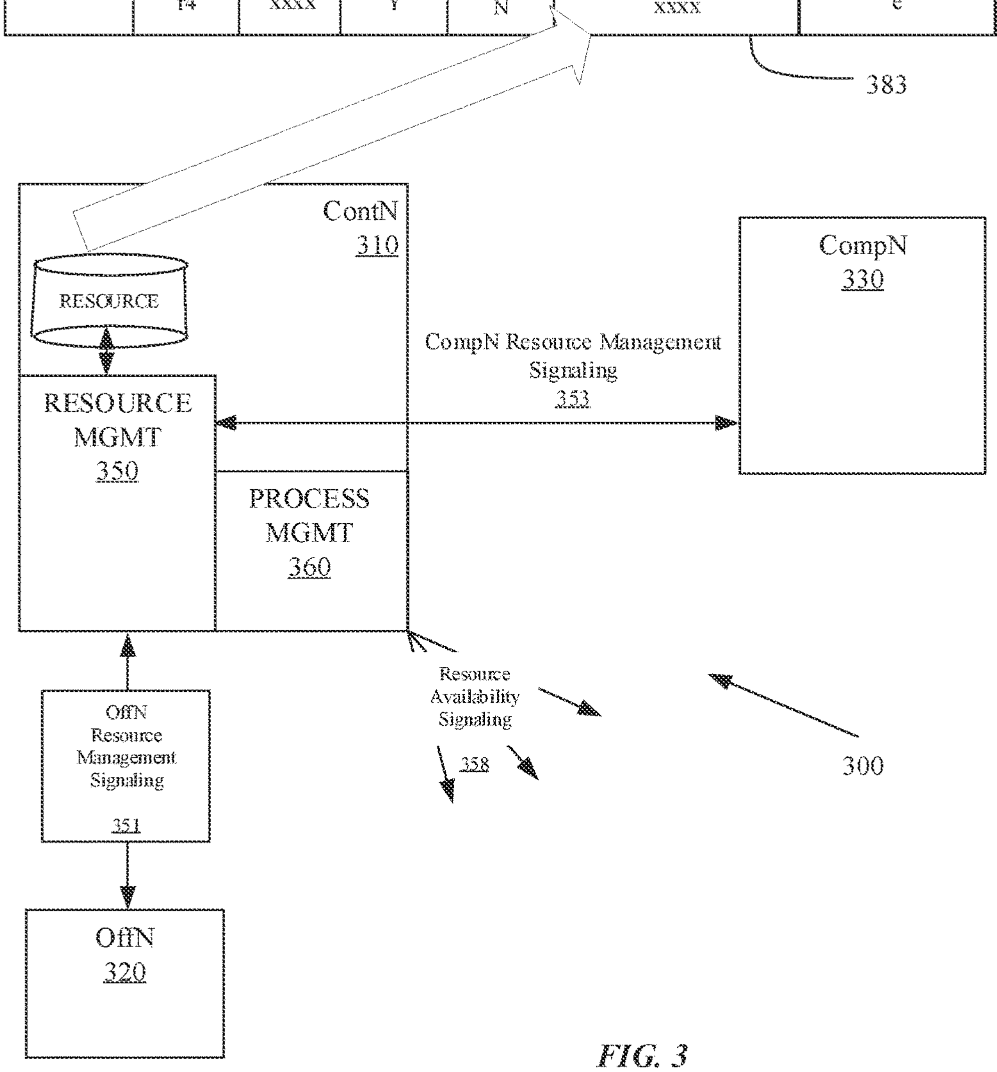
FIG. 3 is a diagram of an example distributed computing resource management function and repository, in accordance with various aspects described.

FIG. 3 illustrates an example of a distributed computing network 300 that includes a ContN 310 that maintains a distributed computing resource repository 383 (e.g., database, view, and so on) that stores registration information for nodes in the network. In the illustrated example, for each node, the repository 383 stores a node type, an OffN ID when the node acts as an OffN, a CompN ID when the node acts as a CompN, and a computing capacity of the node when the node acts as a CompN. Several different parameters may be stored for computing capacity including available RAM, CPU, and GPU capacity. Example node types include, for example, UE, RAN node, server, edge server, application server, hosted node, and so on. In some examples a manufacturer or owner of the node may also be included with the node type. This may help in identifying CompNs based on compatibility with OffNs or for subscription management purposes.

The repository 383 may also store, for each registered node, a location and mobility status. This information may be helpful in selecting a CompN for a distributed computing task for a given OffN based on a proximity of the CompN to the OffN. The ContN 310 and OffN 320 participate in OffN resource management signaling 351 to create and maintain registration information for the OffN in the repository 383. The ContN 310 and CompN 330 participate in CompN resource management signaling 353 to create and maintain registration information for the CompN in the repository 383.

Figure 4:
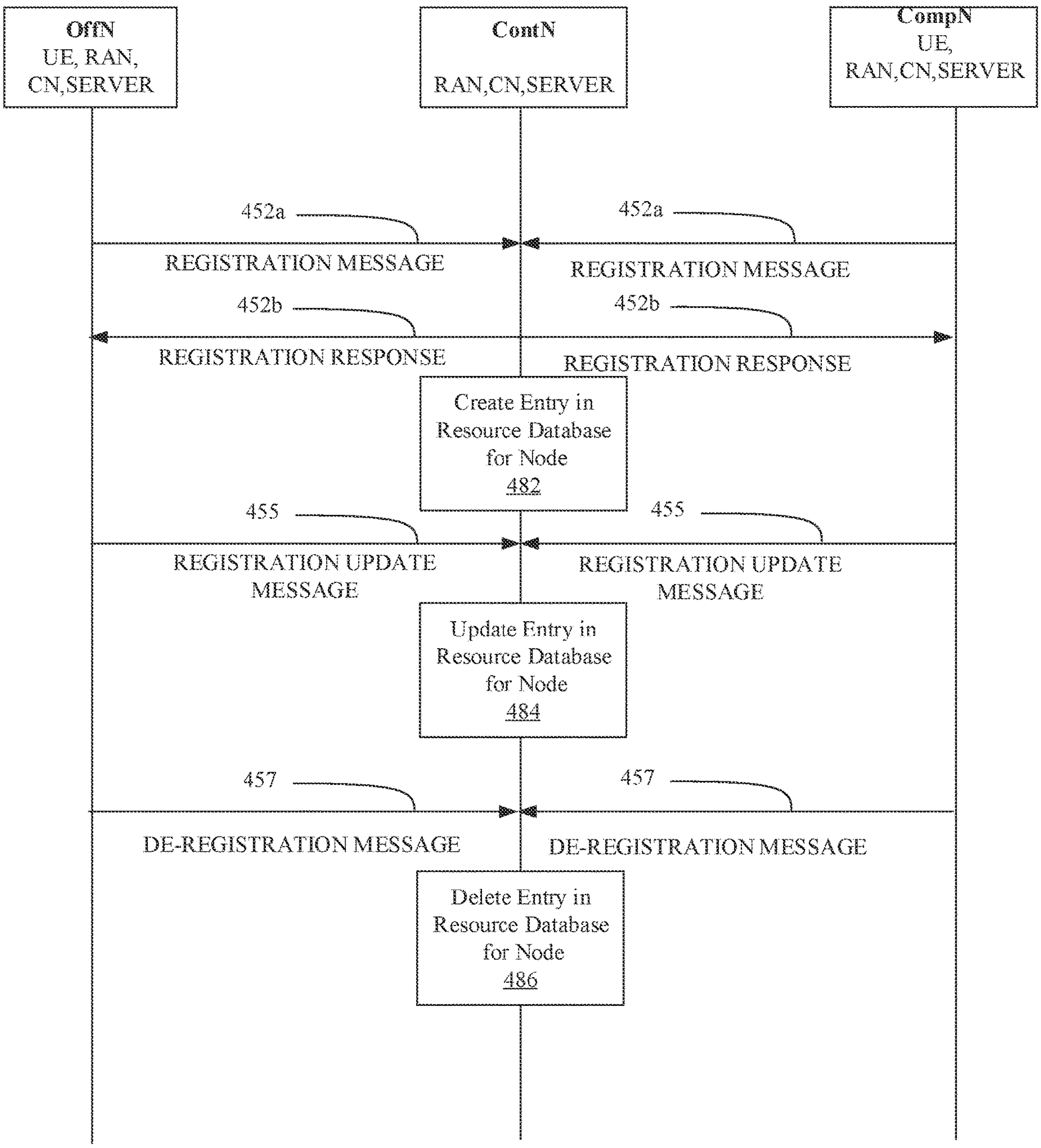
FIG. 4 is a message flow diagram outlining example messages exchanged in maintaining a distributed computing resource management repository, in accordance with various aspects described.

FIG. 4 is a message flow diagram illustrating exemplary OffN resource management signaling and CompN resource management signaling. To register for distributed computing services a device acting as an OffN (e.g., a UE) or a device acting as a CompN (e.g., a UE, RAN node, CN device, or a remote server) transmits a registration message 452*a* to a device acting as the ContN (e.g., a RAN node, a CN device, or a remote server). The registration message 452*a* indicates whether the node is registering as an OffN, a CompN, or both. The registration message 452*a* may include two information elements (IEs) or flags, one IE/flag for OffN and another for CompN, which can be set to indicate that the node is registering to act as an OffN and/or a CompN using the same message.

The registration message 452*a* also indicates a node type. Example node types include, for example, UE, RAN node, server, edge server, application server, hosted node, and so on. In some examples a manufacturer or owner of the node may also be included with the node type. This may help in identifying CompNs based on compatibility with OffNs or for subscription management purposes. When the node is registering as a CompN, the registration message 452*a* includes a maximum computing capacity that can be used for distributed computing. The ContN may screen nodes attempting to register for distributed computing services and only create records in the repository for nodes that are authorized and/or eligible to participate in distributed computing. If the registration message 452*a* is received from an eligible node, the ContN assigns an OffN ID and/or ContN ID to the node and communicates the assigned ID to the node in a registration response message 452*b*. The OffN ID and/or ContN ID may correspond to or be based on a global unique temporary ID, a subscriber concealed ID, or a network function ID for the node. The nodes use the assigned ID in future messages with the ContN and other distributed computing nodes. At 482, the ContN creates an entry or record in the resource repository for the node as illustrated in FIG. 3.

A node may change its registration by way of a registration update message 455. The registration update message 455 may be similar to the registration message except that the message includes an OffN ID or CompN ID. When the ContN receives a registration update message, at 484 the ContN updates an already existing record for the node identified by the OffN ID/CompN ID in the repository rather than creating a new record. A node may revise its registration information in this manner when it changes status as an OffN or CompN or when its computing capacity changes due to a hardware change, use case change, registration in other distributed computing networks, and so on. The computing capacity in the registration update message may be independent of any assigned distributed computing tasks, as the currently available capacity (reflecting active distributed computing tasks) may be managed by the process management function and repository.

A node may de-register from the distributed computing service by sending a de-registration message 457 that includes its OffN ID or CompN ID. In response, at 486 the ContN deletes the node's record or entry from the resource repository.

Process Management

FIG. 5 illustrates a distributed computing system 500 in which a ContN 510 includes process management function 560 that participates in OffN process management signaling 561 and CompN process management signaling 563 to receive offload requests from OffNs and assign associated distributed computing tasks to CompNs. To support these operations, the process management function 560 maintains a process repository 587 reflecting status of processes associated with currently active distributed computing tasks on a per node basis. As with the node types in the resource repository, example node types in the process repository include, for example, UE, RAN node, server, edge server, application server, hosted node, and so on. The process repository 587 includes an indication of remaining available computing capacity (e.g., the AVAILABILITY attribute) amongst the CompNs. This information may be used to advertise up-to-date available distributed computing resources.

To advertise currently available distributed computing resources, the ContN 510 transmits a resource availability message 558 to the OffNs in the network. In some examples, the resource availability messages are transmitted using broadcast, multicast, or unicast messaging (e.g., via system information block (SIB), non-access stratum (NAS) messaging, radio resource control (RRC) container, dedicated or groupcast messaging, and so on). The resource availability message 558 may indicate aggregated available distributed computing resources with respect to all registered CompNs. In some examples, the resource availability message may separately indicate available distributed computing resources with an indication of a corresponding CompN providing different distributed computing resources. The ContN may transmit the resource availability messages periodically, in response to an event, and/or in response to a request.

Figure 6:
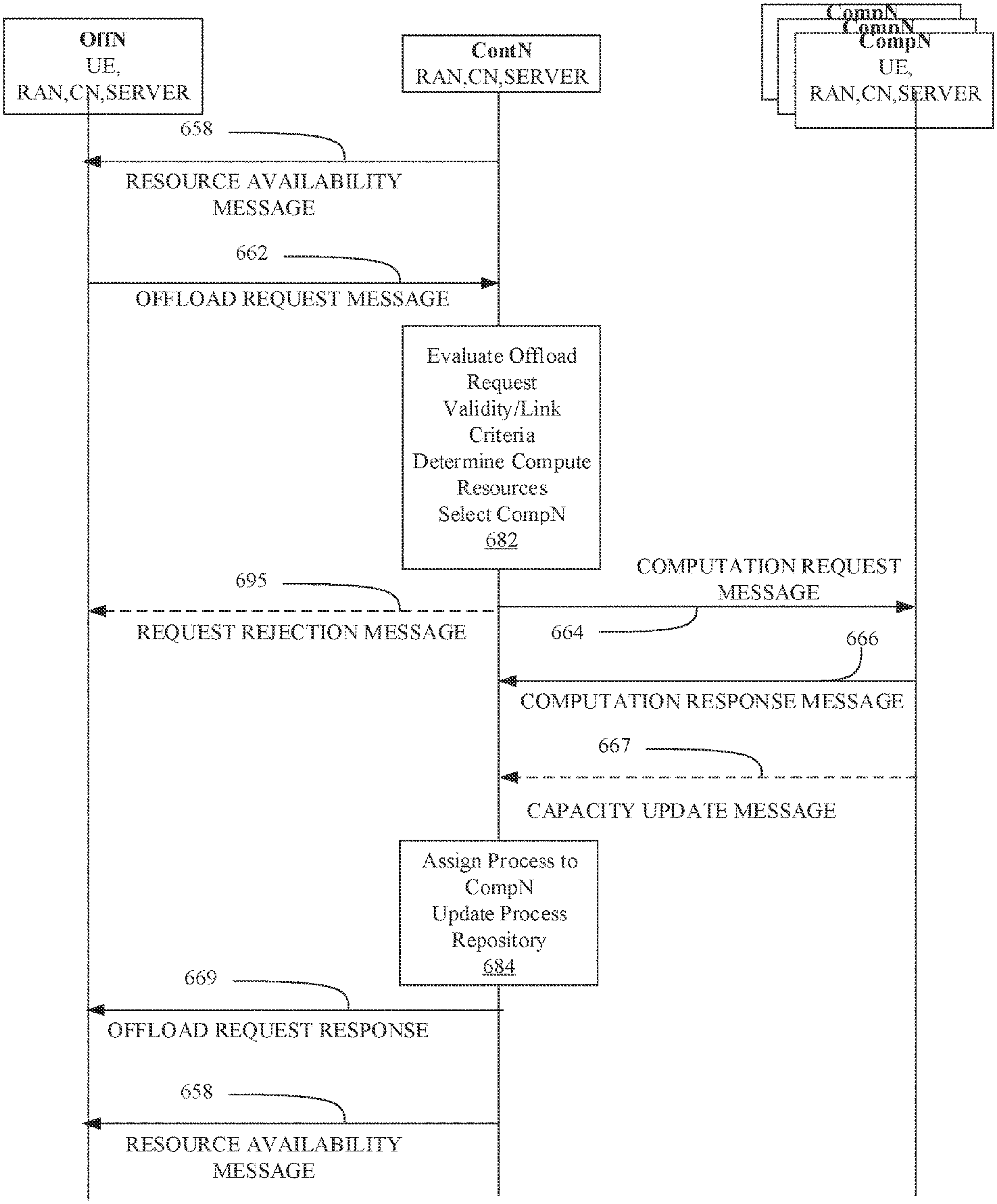
FIG. 6 is a message flow diagram outlining example messages exchanged in management of distributed computing processes, in accordance with various aspects described.

FIG. 6 is a message flow diagram outlining signaling performed by the ContN process management function to process offload requests from OffNs. The ContN periodically, in response to an event, and/or in response to a request, transmits resource availability messages 658 as described above. When a registered OffN has need to offload a distributed computing task, the OffN transmits an offload request message 662. The offload request message identifies the OffN and a distributed computing task. The offload request message 662 may indicate computing resources and or other requirements (e.g., latency, QoS) associated with the task. If the resource availability message 658 separately indicates available resources on a per CompN basis, the offload request message 662 may identify a particular CompN as well. At 682 the ContN evaluates the offload request for validity and according to link criteria and, if the request meets these requirements, determines computing resources associated with the task.

Figure 7:
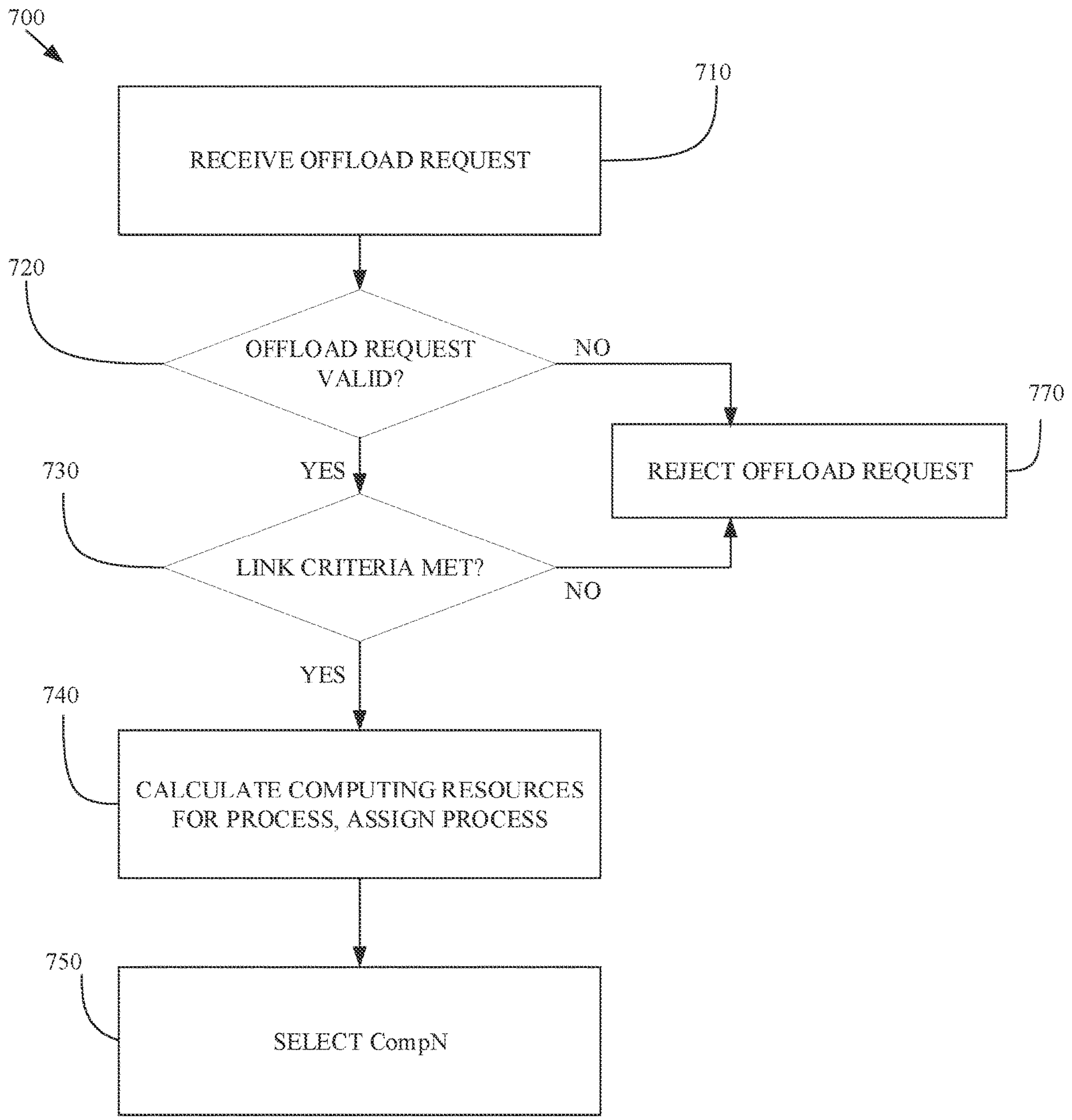
FIG. 7 is a flow diagram outlining an example method for processing offload requests, in accordance with various aspects described.

FIG. 7 is a flow diagram outlining an example method 700 that may be performed by the ContN in response to an offload request. At 710, an offload request is received. At 720, a determination is made as to whether the offload request is valid. If the offload request is not valid at 770 the offload request is rejected. Validity criteria evaluated at 720 may include, for example, a limit on a number of offload requests that may be made by a same node in a certain amount of time. This criteria aims to detect and prevent a distributed denial-of-service attack. Other validity criteria may include a cap on the amount of computing resources associated with the offloading request, offloading policies, types of applications approved for distributed computing (e.g., no bitcoin mining applications), and subscription verification (e.g., a subscription may be required for image processing or other distributed computing services).

If the offload request is valid, at 730 link criteria associated with the request are evaluated. For example, if no distributed computing resources are currently available, the request may be rejected at 770. If current RF conditions are not conducive to the transfer of data and results, the request may be rejected at 770. If latency requirements or QoS associated with the task cannot be met, the request may be rejected at 770. During the link criteria evaluation, the distributed computing task of the request may be mapped to a data rate to determine if the data rate can be supported by current spectrum resources in the OffN's location and, in some examples, based on its mobility conditions. The evaluations made at 720 and 730 prevent the wasting of resources incurred by attempting to complete a distributed computing task that will overwhelm the system or cannot be completed due to current conditions. As can be seen in FIG. 6, if the offload request does not meet the validity and link criteria, the ContN transmits a request rejection message 695.

If the offload request meets the validity and link criteria, to facilitate CompN selection, at 740 the computing resources associated with the task in the offload request are calculated and a unique process ID is assigned to the task. In some examples, the computing resources are indicated by the OffN in the offload request. The required computing resources may be defined in terms of latency, expected time to complete, an input data size, and/or an output data size. In other examples, the ContN determines the computing resources based on stored information about distributed computing tasks or applications that generate distributed computing tasks.

Returning to FIG. 5, it can be seen that the example process repository 587 records distributed computing tasks on a process basis for each CompN. The repository 587 records, for each CompN, a node type, a CompN ID for the CompN, an OffN ID for an associated pending distributed computing task, the capacity of the node (which may be taken from the registration information), a process ID for each pending distributed computing task assigned to the node, and an allocation of computing resources for each pending process. The remaining available computing capacity (e.g., the difference between the capacity and allocation) is recorded in the process repository. The available computing capacity is indicated by the resource availability message 558 either in aggregate or on a per CompN basis.

Selection of CompN

Returning to FIG. 7, after computing resources for the distributed computing task are calculated, at 750, a CompN is selected for performing the distributed computing task. The ContN uses information in the process repository regarding active distributed computing processes and remaining availability for CompNs. If no suitable CompN has capacity for performing the task, a request rejection message (e.g., 695 of FIG. 6) is sent. When the offload request indicates a CompN and the CompN currently has capacity to perform the task, the indicated CompN may be selected by the ContN. If the requested CompN does not have the capacity, the ContN may send a request rejection message (e.g., 695 in FIG. 6), or select a different CompN for the task.

In other examples, the ContN evaluates the distributed computing task based on some criteria and selects one or more CompNs that are well suited to the task according to the criteria. Many different techniques may be used to select a CompN from amongst CompNs that have sufficient capacity for performing a task. The ContN may select a CompN that is capable of performing the task while maintaining a key performance indicator (KPI). The ContN may select CompNs in a manner that balances the distributed computing load evenly amongst the CompNs. The ContN may prefer stationary and/or physically proximate CompNs, especially for latency sensitive tasks. The ContN may distribute a task amongst several CompNs.

A common characterization of distributed computing tasks may be adopted by the distributed computing network to facilitate efficient distribution of tasks. A traffic classification may characterize a task based on a number of iterations and a number of collaborating OffNs for the task. A computation complexity may characterize a task based on a number of compute unit operations (e.g., multiplication) and memory used by the task. A communication requirement may characterize a number of bits that will be sent and received during offloading of the task and receiving results of the task. A precision requirement may characterize a level of quantization necessary for variables and operations associated with the task. A quality of compute service classification may assign a predefined rating to the task based on required latency, precision, and so on. The offload request may include parameters characterizing the distributed computing task according to any of the above classifications to assist the ContN in selecting a CompN for the task.

Other considerations when selecting a CompN (or declining an offload request) are cost and performance effect of the offloading operation. Energy consumption cost, latency cost, communication cost, and computation costs may also be considered by the ContN.

Computing capabilities of each CompN may be characterized by available resources (e.g., floating point operations per second (FLOPs)), a size of available memory, and available communication resources (e.g. frequency, bandwidth).

In one example, the ContN evaluates the latency associated with the task, a CPU requirement (e.g., number of cores) for the task, and a GPU requirement (e.g., number of cores) for the task. These requirements may be indicated in the offload request or the ContN may determine one or more of the requirements based on an application (e.g., a class characterization of the distributed computing task such as scene reconstruction, remote rendering, optical character recognition, and so on) associated with the task and, optionally, computing resources consumed by the task in a previous occurrence of the task. In some examples, tasks that will require a heavy computing load (high CPU/GPU requirements) and low latency can be assigned to CompNs implemented by dedicated physical servers. These servers may be installed in strategic geographic locations (e.g., data centers) to support low latency distributed computing.

CompNs implemented by RAN nodes or CN devices may be selected for tasks with a lighter computing load but with low latency. When the offload requests are light and bursty, RAN nodes located at the geographic location of the requests are well situated to perform the tasks. The ContN may recognize trends in offload requests and request activation of CompNs as needed.

When the distributed computing network is heavily loaded or experiencing server blackouts, CompNs implemented by UEs may be leveraged to perform non-latency sensitive tasks.

The ContN may designate certain CompNs as hosted nodes for performing a certain type of task. The hosted nodes may be implemented by a same wireless communication device as is acting as the ContN. This approach may provide efficiency in supporting repetitive or common distributed computing tasks. The ContN may check to see if a hosted node is available for a requested task and prioritize selecting a hosted node when possible.

Returning to FIG. 6, after selecting one or more CompNs at 682, the ContN transmits a computation requests message 664 to the selected CompN(s). The computation request message 664 may indicate computing resource requirements and/or values for any of the disclosed characterization parameters associated with the task to assist the CompN in determining whether it will accept the distributed computing task. At 666 the CompN(s) transmit a computation response message 666 either confirming or rejecting the task. The computation response message 666 may also indicate a level of computing quality (e.g., latency, speed) that may be supported. In response to a negative computation response message, the ContN may, if the latency requirement of the task allows, select a different CompN and transmit a computation request message 664 to the different CompN or the ContN may send a negative offload request response 669 to the OffN.

Assignment of CompN

At 684, in response to an affirmative computation response message, the ContN assigns the process to the CompN(s). The ContN updates the process repository record for each assigned CompN to include the process ID and to reflect the updated allocated and available computing resources for the CompN. The ContN transmits an offload request response message 669 to the OffN that indicates the Comp (N) that will be performing the distributed computing task. The offload request response message 669 may specify physical layer configurations (UL/DL grants, and so) for use in transferring associated data and/or traffic profile information or a guaranteed quality of compute service classification. The OffN now has the information needed to instantiate a distributed computing task with the identified CompN(s).

The CompN transmits a capacity update message 667 to the ContN to inform the ContN of any changes to its current processing load. The capacity update message may be transmitted using broadcast, multicast, or unicast messaging (e.g., via system information block (SIB), non-access stratum (NAS) messaging, radio resource control (RRC) container, dedicated or groupcast messaging, and so on). The capacity update message may be transmitted periodically, in response to an event, or in response to a request from the ContN. In some examples, when the CompN accepts a distributed computing task or completes a distributed computing task, the CompN transmits a capacity update message reflecting the resulting change in its available computing resources. In other examples, the ContN also tracks changes in the CompN loading in the repository based on processes that the ContN has assigned to the CompN. It is noted that the second resource availability message 658 in FIG. 6 will reflect the reduced availability of resources due to the newly assigned distributed computing task.

Figure 8:
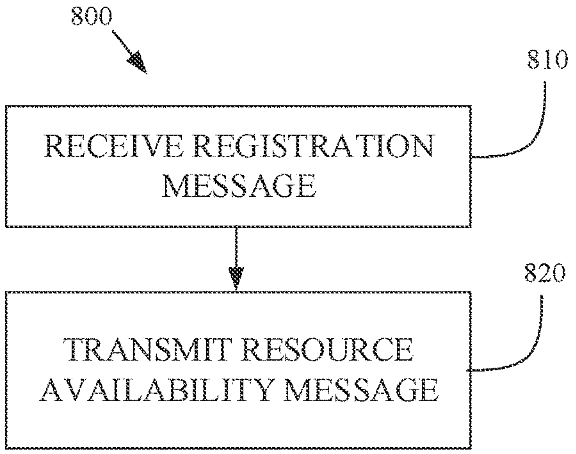
FIG. 8 is a flow diagram outlining an example method for performing a resource management function, in accordance with various aspects described.
Figure 10:
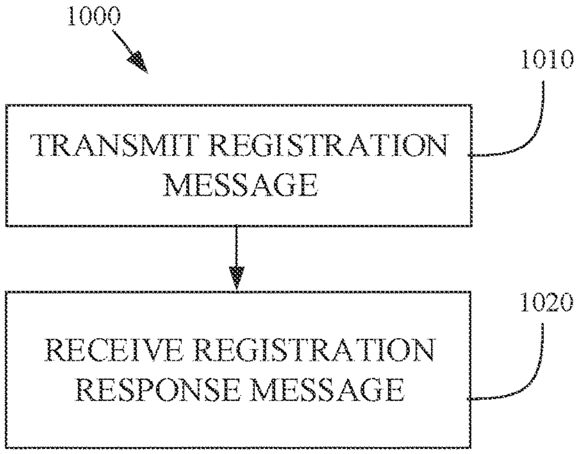
FIG. 10 is a flow diagram outlining an example method for performing a resource management function, in accordance with various aspects described.
Figure 9:
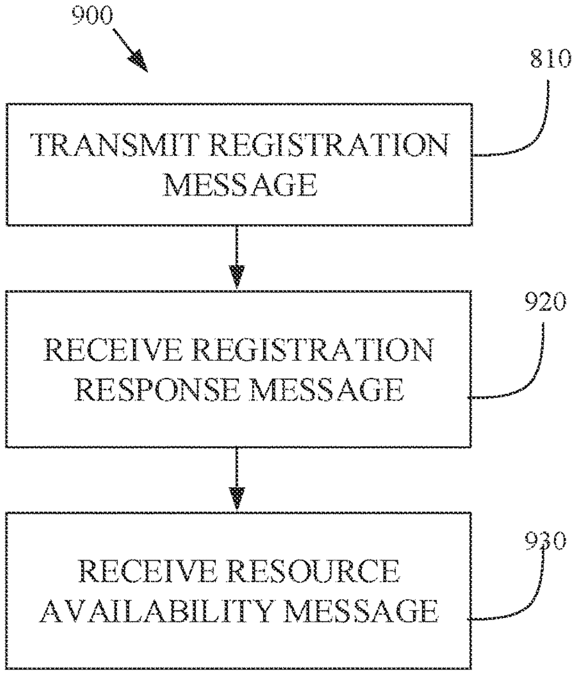
FIG. 9 is a flow diagram outlining an example method for performing a resource management function, in accordance with various aspects described.

FIGS. 8, 9, and 10 are flow diagrams of example methods performed by the various entities of a distributed computing system to implement a resource management function of a distributed computing system. FIG. 8 illustrates an example method 800 for performing a resource management function. The method 800 may be performed by a ContN/resource management function (e.g., 110 of FIG. 1, 210/250 of FIG. 2, and/or 310/350 of FIG. 3). The method 800 includes, at 810, receiving a registration message (e.g., message 452*a* of FIG. 4) from another wireless communication device indicating whether the other wireless communication device acts as an offload node (OffN) for distributed computing or a compute node (CompN) for distributed computing.

The method includes, at 820, based on the registration information of the other wireless communication device, transmitting a resource availability message (e.g., message 358 of FIG. 3) indicating available distributed computing resources to wireless communication devices acting as OffNs. The resource availability message may be transmitted via a system information block (SIB), a non-access stratum (NAS), radio resource control (RRC) container, or dedicated signaling with the wireless communication device acting as the OffN or the CompN. The resource availability message may be transmitted periodically, in response to an event, or in response to a request.

FIG. 9 illustrates an example method 900 for performing a resource management function. The method 900 may be performed by an OffN (e.g., 120 of FIG. 1, 220 of FIG. 2, and/or 320 of FIG. 3). The method 900 includes, at 910, transmitting a registration message including OffN registration information (e.g., message 452*a* of FIG. 4) to a wireless communication device acting as a ContN. At 920, the method includes receiving a registration response message (e.g., message 452*b* of FIG. 4) from the wireless communication device acting as the ContN, the registration response message indicating a OffN ID.

The method includes, at 930, receiving a resource availability message (e.g., message 658 of FIG. 6) indicating available distributed computing resources. The resource availability message may be transmitted via a system information block (SIB), a non-access stratum (NAS), radio resource control (RRC) container, or dedicated signaling with the wireless communication device acting as the OffN or the CompN. The resource availability message may be transmitted periodically, in response to an event, or in response to a request.

FIG. 10 illustrates an example method 1000 for performing a resource management function. The method 1000 may be performed by a CompN (e.g., 130 of FIG. 1, 230 of FIG. 2, and/or 330 of FIG. 3). The method 1000 includes, at 1010, transmitting a registration message including CompN registration information (e.g., message 452*a* of FIG. 4) to a wireless communication device acting as a ContN. At 1020, the method includes receiving a registration response message (e.g., message 452*b* of FIG. 4) from the wireless communication device acting as the ContN. The registration response message indicates a ContN ID.

The method 1000 may include transmitting a capacity update message (e.g., message 667 of FIG. 6) to the wireless communication device acting as the ContN. Each capacity update message indicates updated distributed computing capacity of the CompN, including one or more of computing resources, memory resources, or communication resources. The capacity update message may be transmitted periodically, in response to an event, or in response to a request. The capacity update message may be transmitted via a system information block (SIB), a non-access stratum (NAS), radio resource control (RRC) container, or dedicated signaling with the wireless communication device acting as the OffN or the CompN.

Figure 11:
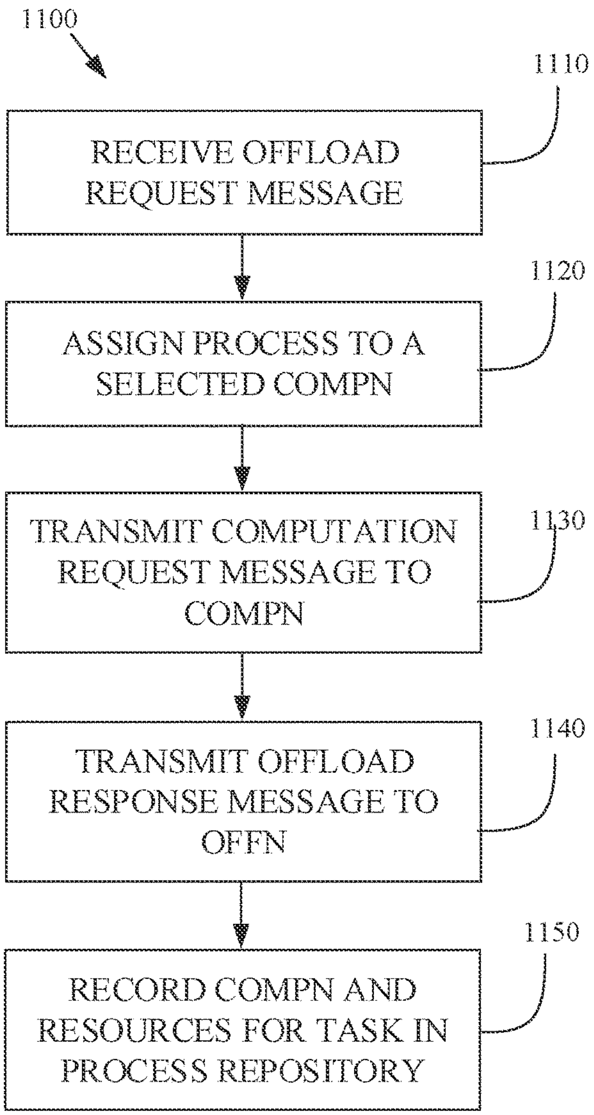
FIG. 11 is a flow diagram outlining an example method for performing a process management function, in accordance with various aspects described.
Figure 12:
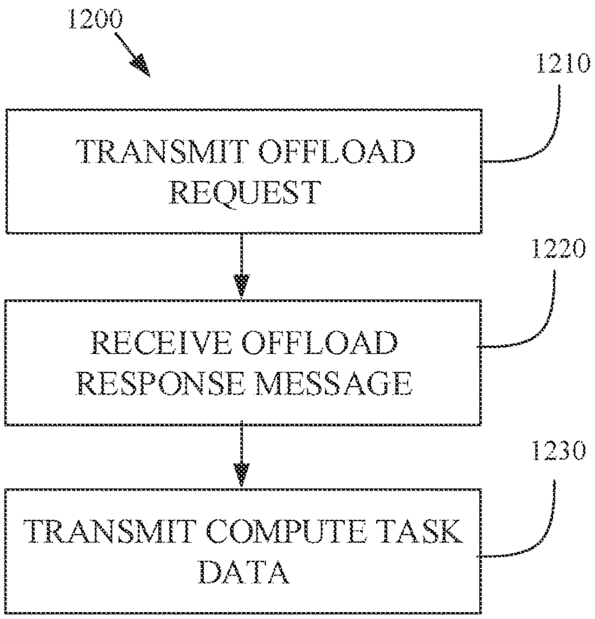
FIG. 12 is a flow diagram outlining an example method for performing a process management function, in accordance with various aspects described.
Figure 13:
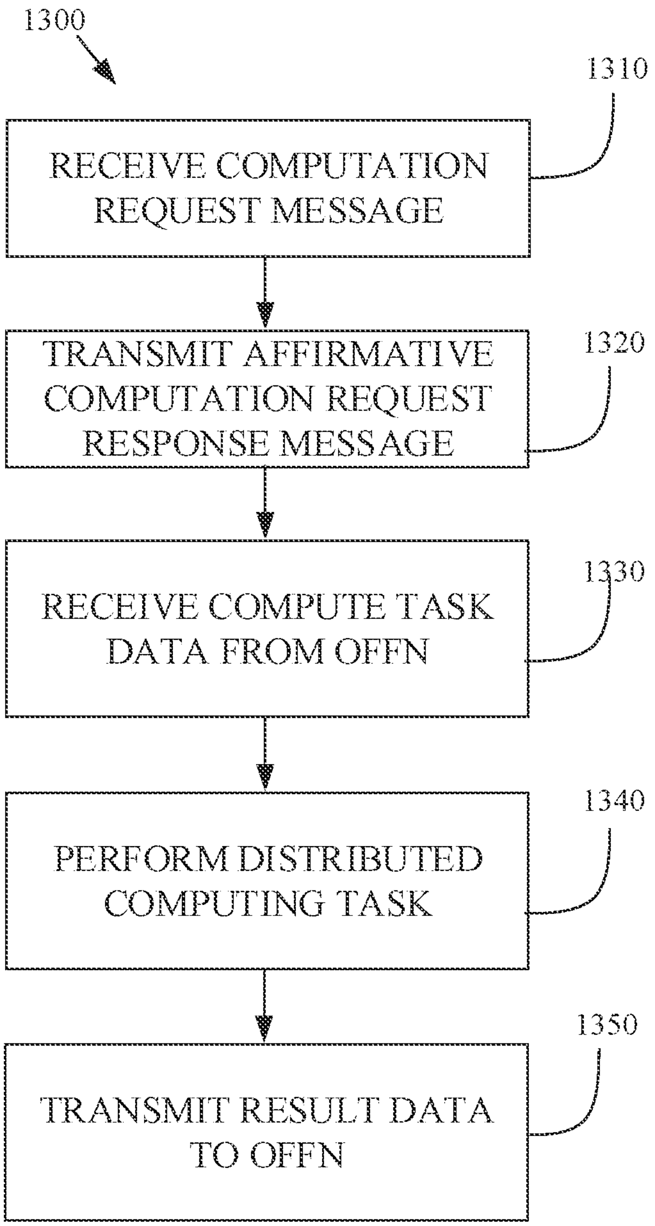
FIG. 13 is a flow diagram outlining an example method for performing a process management function, in accordance with various aspects described.

FIGS. 11, 12, and 13 are flow diagrams outlining example methods for performing a process management function. FIG. 11 illustrates an example method 1100 that may be performed by a ContN/process management function (e.g., 110 of FIG. 1, 210/260 of FIG. 2, and/or 510/560 of FIG. 5). The method includes, at 1110, receiving an offload request message (e.g., message 662 of FIG. 6) from a wireless communication device acting as a distributed computing offload node (OffN). The offload request message indicates a distributed computing task. The method includes, at 1120, in response to the offload request message, assigning a process to a selected wireless communication device acting as a distributed computing compute node (CompN). The process is associated with the distributed computing task.

A computation request message (e.g., message 664 of FIG. 6) indicating the distributed computing task is transmitted to the selected wireless communication device acting as a CompN at 1130. At 1140, in response to receiving an affirmative computation request response from the selected wireless communication device, an offload request response message (e.g., message 669 of FIG. 6) is transmitted to the wireless communication device acting as the OffN. The offload request response message indicates the selected wireless communication device as the CompN for the distributed computing task. The method includes, at 1150, recording, in a process repository (e.g., 587 of FIG. 5), a CompN ID of the selected wireless communication device and distributed computing resources associated with the distributed computing task both mapped to a process ID for the process.

In some examples, such as the example of FIG. 7, the method 1100 includes evaluating one or more criteria related to offload request validity, OffN authentication, or link requirements for the distributed computing task, rejecting the offload request message, and refraining from assigning a process to the distributed compute task when one of the criteria is violated. The one or more criteria may include a maximum number of offload requests from a same OffN, a list of approved applications for requesting distributed computing task offload, whether the OffN has a subscription for the distributed computing task, one or more OffN policy criteria, availability of a sufficient quantity of distributed computing resources for the distributed compute task, sufficient radio frequency resource quantity or quality for transferring data associated with the distributed computing task, or latency requirements for the distributed computing task.

In some examples, the method 1100 includes selecting the wireless communication device acting as CompN based on a CompN designated as a host node for an application associated with the distributed computing task or one or more of a number of collaborating OffNs, a number of computing iterations, a quantity of input data or result data, a precision requirement, a latency requirement, or a level of computing complexity associated with the distributed computing task.

FIG. 12 illustrates an example method 1200 for performing a process management function. The method 1200 may be performed by a OffN (e.g., 120 of FIG. 1, 220 of FIG. 2, and/or 520 of FIG. 5). The method 1200 includes, at 1210, transmitting an offload request message (e.g., message 662 of FIG. 6) to a wireless communication device acting as a ContN. The offload request message indicates a distributed computing task. At 1220, the method includes receiving an offload request response message (e.g., message 669 of FIG. 6) from the wireless communication device acting as the ContN. The offload request response message indicates a selected wireless communication device acting as a distributed computing compute node (CompN) for the distributed computing task. At 1230, the method includes transmitting compute task data to the selected wireless communication device.

In some examples, the method 1200 includes receiving a resource availability message (e.g., message 658 of FIG. 6) from the wireless communication device acting as the ContN, wherein the message indicates available computing resources mapped to CompN identifiers and selecting a CompN based on the distributed computing task. In these examples, the offload request message includes a CompN ID of the selected CompN. The CompN may be selected based on one or more of an application associated with the distributed computing task, a number of collaborating OffNs, a number of computing iterations, a quantity of input data or result data, a precision requirement, a latency requirement, or a level of computing complexity associated with the distributed computing task.

FIG. 13 illustrates an example method 1300 for performing a process management function. The method 1300 may be performed by a CompN (e.g., 130 of FIG. 1, 230 of FIG. 2, and/or 530 of FIG. 5). The method includes, at 1310, receiving a computation request message (e.g., message 664 of FIG. 6) from a wireless communication device acting as a distributed computing control node (ContN). The computation request message indicates a distributed computing task. At 1320, when the wireless communication device has sufficient computing resources to perform the distributed computing task, the method includes transmitting an affirmative computation request response (e.g., message 666 of FIG. 6) to the wireless communication device acting as the ContN.

At 1330, the method includes receiving compute task data from a wireless communication device acting as a distributed computing offload node (OffN) for the distributed computing task. The method includes, at 1340, performing the distributed computing task to generate result data. At 1350, the result data is transmitted to the wireless communication device acting as the OffN.

In some examples, the method 1300 includes transmitting a capacity update message (e.g., message 667 of FIG. 6) to the wireless communication device acting as ContN. The capacity update message indicates available computing resources remaining based on computing resources associated with the distributed computing task. The capacity update message indicates updated distributed computing capacity of the CompN, including one or more of computing resources, memory resources, or communication resources. The capacity update message may be transmitted periodically, in response to an event, or in response to a request. The capacity update message may be transmitted via a system information block (SIB), a non-access stratum (NAS), radio resource control (RRC) container, or dedicated signaling with the wireless communication device acting as the OffN or the CompN.

It can be seen from the foregoing description that providing a ContN with resource management and process management functions supports a flexible framework for supporting distributed computing.

Above are several descriptions of flow diagrams outlining example methods and exchanges of messages. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term encode when used with reference to some entity or value of an entity is to be construed broadly as encompassing any manner or technique for generating a data sequence or signal that communicates the entity to another component.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. The term derive should be construed to encompass computing or calculating the entity or value of the entity based on other quantities or entities. The term derive should be construed to encompass any manner of deducing or identifying an entity or value of the entity.

As used herein, the term indicate when used with reference to some entity (e.g., parameter or setting) or value of an entity is to be construed broadly as encompassing any manner of communicating the entity or value of the entity either explicitly or implicitly. For example, bits within a transmitted message may be used to explicitly encode an indicated value or may encode an index or other indicator that is mapped to the indicated value by prior configuration. The absence of a field within a message may implicitly indicate a value of an entity based on prior configuration.

Figure 14:
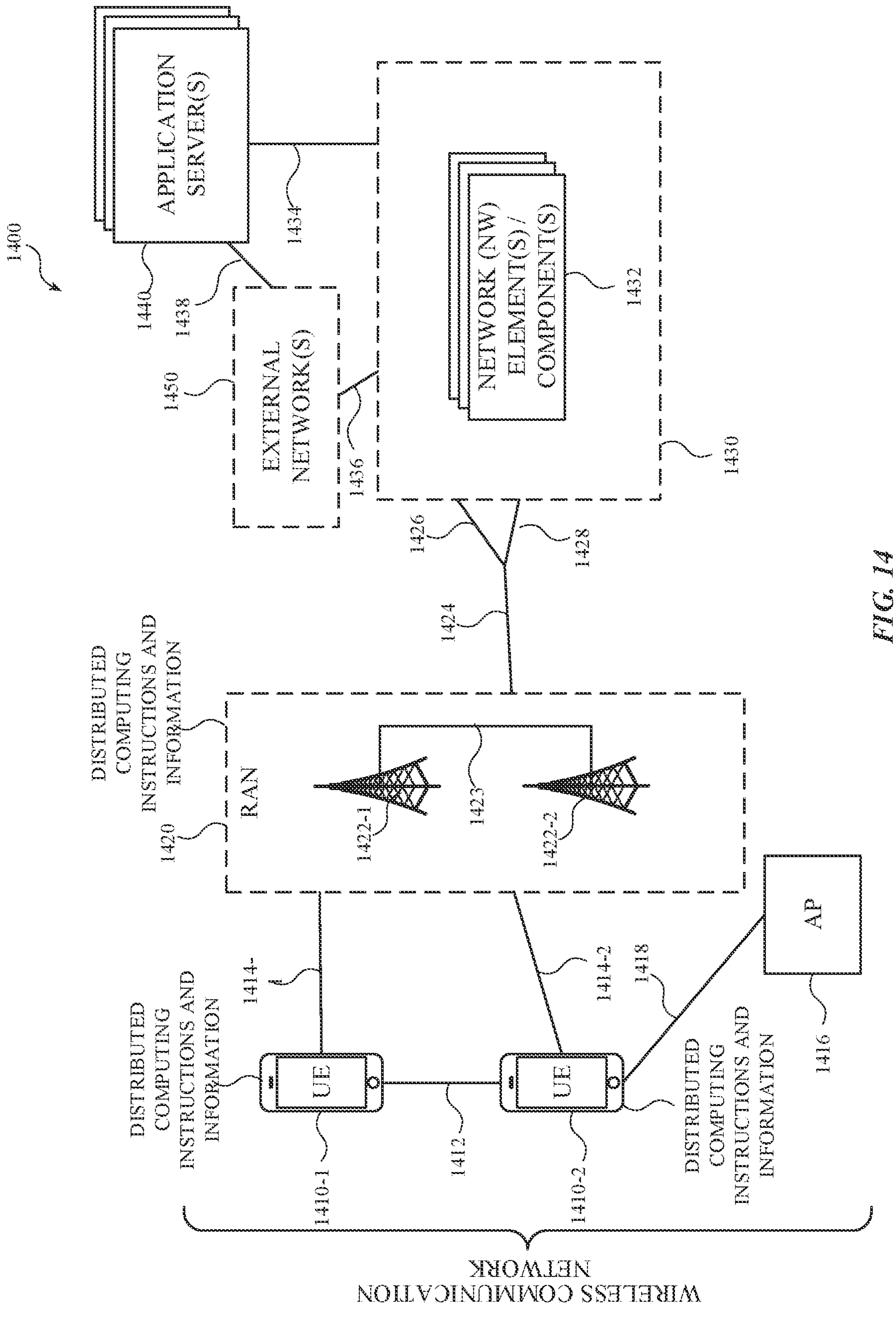
FIG. 14 is a functional block diagram of a wireless communication network, in accordance with various aspects described.

FIG. 14 is an example network 1400 according to one or more implementations described herein. Example network 1400 may include UEs 1410-1, 1410-2, etc. (referred to collectively as "UEs 1410" and individually as "UE 1410"), a radio access network (RAN) 1420, a core network (CN) 1430, application servers 1440, and external networks 1450.

The systems and devices of example network 1400 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 1400 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 1410 may include smartphones (e.g., handheld touchscreen mobile computing devices connectable to one or more wireless communication networks). Additionally, or alternatively, UEs 1410 may include other types of mobile or non-mobile computing devices capable of wireless communications, such as personal data assistants (PDAs), pagers, laptop computers, desktop computers, wireless handsets, watches etc. In some implementations, UEs 1410 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 1410 may use one or more wireless channels 1412 to communicate with one another. UEs 1410 may communicate and establish a connection with (e.g., be communicatively coupled) with RAN 1420, which may involve one or more wireless channels 1414-1 and 1414-2, each of which may comprise a physical communications interface/layer.

As described herein, UEs 1410-1, 1410-2 may store distributed computing instructions and information including configurations and/or instructions for acting as a compute node (CompN) or an offload node OffN in a distributed computing system.

As shown, UE 1410 may also, or alternatively, connect to access point (AP) 1416 via connection interface 1418, which may include an air interface enabling UE 1410 to communicatively couple with AP 1416. AP 1416 may comprise a wireless local area network (WLAN), WLAN node, WLAN termination point, etc. The connection 1418 may comprise a local wireless connection, such as a connection consistent with any IEEE 702.11 protocol, and AP 1416 may comprise a wireless fidelity (Wi-Fi®) router or other AP. While not explicitly depicted in FIG. 14, AP 1416 may be connected to another network (e.g., the Internet) without connecting to RAN 1420 or CN 1430.

RAN 1420 may include one or more RAN nodes 1422-1 and 1422-2 (referred to collectively as RAN nodes 1422, and individually as RAN node 1422) that enable channels 1414-1 and 1414-2 to be established between UEs 1410 and RAN 1420. RAN nodes 1422 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 1422 may include a roadside unit (RSU), a transmission reception point (TRxP or TRP), and one or more other types of ground stations (e.g., terrestrial access points). In some scenarios, RAN node 1422 may be a dedicated physical device, such as a macrocell base station, and/or a low power (LP) base station for providing femtocells, picocells or the like having smaller coverage areas, smaller user capacity, or higher bandwidth compared to macrocells. Additionally, or alternatively, one or more of RAN nodes 1422 can be next generation eNBs (i.e., gNBs) that can provide evolved universal terrestrial radio access (E-UTRA) user plane and control plane protocol terminations 1426, 1428 toward UEs 1410, and that can be connected to a 5G core network (5GC) 1430 via an NG interface 1424.

The RAN nodes 1422 may be configured to communicate with one another via interface 1423. In implementations where the system is an LTE system, interface 1423 may be an X2 interface. In NR systems, interface 1423 may be an Xn interface. The X2 interface may be defined between two or more RAN nodes 1422 (e.g., two or more eNBs/gNBs or a combination thereof) that connect to evolved packet core (EPC) or CN 1430, or between two eNBs connecting to an EPC.

As shown, RAN 1420 may be connected (e.g., communicatively coupled) to CN 1430. CN 1430 may comprise a plurality of network elements 1432, which are configured to offer various data and telecommunications services to customers/subscribers (e.g., users of UEs 1410) who are connected to the CN 1430 via the RAN 1420. In some implementations, CN 1430 may include an evolved packet core (EPC), a 5G CN, and/or one or more additional or alternative types of CNs. The components of the CN 1430 may be implemented in one physical node or separate physical nodes including components to read and execute instructions from a machine-readable or computer-readable medium (e.g., a non-transitory machine-readable storage medium).

As described herein, certain of the CN network elements 1432 may store distributed computing instructions and information including configurations and/or instructions for acting as a control node (ContN), a compute node (CompN), or an offload node OffN in a distributed computing system.

As described herein, RAN nodes 1422 may store distributed computing instructions and information including configurations and/or instructions for acting as a control node (ContN), a compute node (CompN), or an offload node OffN in a distributed computing system.

Figure 15:
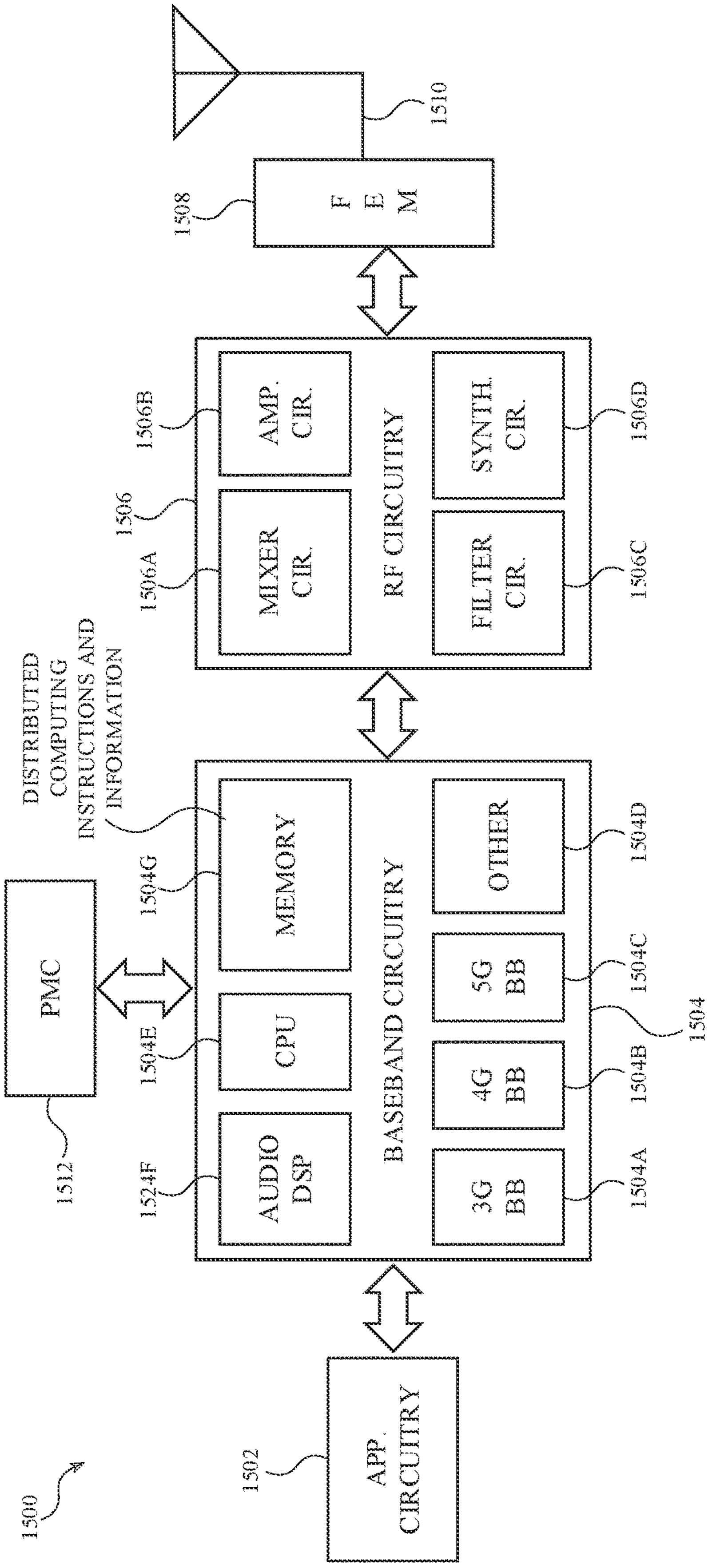
FIG. 15 illustrates a simplified block diagram of a network device, in accordance with various aspects described.

FIG. 15 is a diagram of an example of components of a network device (e.g., a device acting as an OffN, a ContN, or a CompN of FIGS. 1-12) according to one or more implementations described herein. In some implementations, the device 1500 can include application circuitry 1502, baseband circuitry 1504, RF circuitry 1506, front-end module (FEM) circuitry 1508, one or more antennas 1510, and power management circuitry (PMC) 1512 coupled together at least as shown. The components of the illustrated device 1500 can be included in a UE or a RAN node. In some implementations, the device 1500 can include fewer elements (e.g., a RAN node may not utilize application circuitry 1502, and instead include a processor/controller to process IP data received from a CN or an Evolved Packet Core (EPC)). In some implementations, the device 1500 can include additional elements such as, for example, memory/storage, display, camera, sensor (including one or more temperature sensors, such as a single temperature sensor, a plurality of temperature sensors at different locations in device 1500, etc.), or input/output (I/O) interface. In other implementations, the components described below can be included in more than one device (e.g., said circuitries can be separately included in more than one device for Cloud-RAN (C-RAN) implementations).

The application circuitry 1502 can include one or more application processors. For example, the application circuitry 1502 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1500. In some implementations, processors of application circuitry 1502 can process IP data packets received from an EPC. In some implementations, processors of the application circuitry 1502 may be configured to generate distributed computing task data, process received distributed computing task results, and/or perform distributed computing tasks.

The baseband circuitry 1504 can include circuitry such as, but not limited to, one or more single-core or multi-core processors. The baseband circuitry 1504 can include one or more baseband processors or control logic to process baseband signals received from a receive signal path of the RF circuitry 1506 and to generate baseband signals for a transmit signal path of the RF circuitry 1506. Baseband circuitry 1504 can interface with the application circuitry 1502 for generation and processing of the baseband signals and for controlling operations of the RF circuitry 1506. For example, in some implementations, the baseband circuitry 1504 can include a 3G baseband processor 1504A, a 4G baseband processor 1504B, a 5G baseband processor 1504C, or other baseband processor(s) 1504D for other existing generations, generations in development or to be developed in the future (e.g., 5G, 6G, etc.).

The baseband circuitry 1504 (e.g., one or more of baseband processors 1504A-D) can handle various radio control functions that enable communication with one or more radio networks via the RF circuitry 1506. In other implementations, some or all of the functionality of baseband processors 1504A-D can be included in modules stored in the memory 1504G and executed via a Central Processing Unit (CPU) 1504E. In some implementations, the baseband circuitry 1504 can include one or more audio digital signal processor(s) (DSP) 1504F.

In some implementations, memory 1504G may receive and/or store distributed computing instructions and information for acting as a ContN, a CompN, or an OffN as described with reference to FIGS. 1-12 to transmit and receive signaling for coordination of distributed computing.

RF circuitry 1506 can enable communication with wireless networks using modulated electromagnetic radiation through a non-solid medium. In various implementations, the RF circuitry 1506 can include switches, filters, amplifiers, etc. to facilitate the communication with the wireless network. RF circuitry 1506 can include a receive signal path which can include circuitry to down-convert RF signals received from the FEM circuitry 1508 and provide baseband signals to the baseband circuitry 1504. RF circuitry 1506 can also include a transmit signal path which can include circuitry to up-convert baseband signals provided by the baseband circuitry 1504 and provide RF output signals to the FEM circuitry 1508 for transmission.

In some implementations, the receive signal path of the RF circuitry 1506 can include mixer circuitry 1506A, amplifier circuitry 1506B and filter circuitry 1506C. In some implementations, the transmit signal path of the RF circuitry 1506 can include filter circuitry 1506C and mixer circuitry 1506A. RF circuitry 1506 can also include synthesizer circuitry 1506D for synthesizing a frequency for use by the mixer circuitry 1506A of the receive signal path and the transmit signal path.

Examples herein can include subject matter such as a method, means for performing acts or blocks of the method, at least one machine-readable medium including executable instructions that, when performed by a machine or circuitry (e.g., a processor (e.g., processor, etc.) with memory, an application-specific integrated circuit (ASIC), a field programmable gate array (FPGA), or the like) cause the machine to perform acts of the method or of an apparatus or system for distributed computing according to implementations and examples described.

Example 1 is a wireless communication device configured to act as a distributed computing control node (ContN), the wireless communication device including a memory and a processor coupled to the memory. The processor is configured to, when executing instructions stored in the memory, cause the device to receive a registration message from another wireless communication device. The registration message includes registration information indicating whether the wireless communication device acts as an offload node (OffN) for distributed computing or a compute node (CompN) for distributed computing. The processor is configured to, based on the registration information of the other wireless communication device, transmit a resource availability message indicating available distributed computing resources to wireless communication devices acting as OffNs.

Example 2 includes the subject matter of example 1, wherein the registration message includes an OffN information element or an OffN flag that is set to indicate that the respective wireless communication device acts as an OffN for distributed computing and a CompN information element or a CompN flag that is set to indicate that the respective wireless communication device acts as an CompN for distributed computing.

Example 3 includes the subject matter of example 1, wherein the processor is configured to cause the device to in response to receiving a registration message from a first wireless communication device, when the registration information indicates that the first wireless communication device acts as an OffN for distributed computing, assign an OffN identifier (ID) to the first wireless communication device, create a record in a resource repository that maps the registration information of the first wireless communication device to the OffN ID, transmit a registration response message to the first wireless communication device indicating the OffN ID. When the registration information indicates that the first wireless communication device acts as a CompN for distributed computing, the processor is configured to assign an CompN identifier (ID) to the first wireless communication device, create a record in the resource repository that maps the registration information of the first wireless communication device to the CompN ID, and transmit a registration response message to the first wireless communication device indicating the CompN ID.

Example 4 includes the subject matter of example 3, wherein the OffN ID or the CompN ID includes a global unique temporary identifier, a subscriber concealed identifier, or a network function identifier assigned to the first wireless communication device.

Example 5 includes the subject matter of example 1, wherein the processor is configured to cause the device to receive a registration update message from a wireless communication device acting as an OffN or a CompN, wherein the registration update message includes updated registration information; and in response, update the resource repository based on the updated registration information.

Example 6 includes the subject matter of example 1, wherein the processor is configured to cause the device to receive a de-registration message from a wireless communication device acting as an OffN or a CompN, wherein the de-registration message indicates that the wireless communication device no longer acts as an OffN or a CompN; and in response, update the resource repository based on the de-registration message.

Example 7 includes the subject matter of example 1, wherein the processor is configured to cause the device to receive a capacity update message from a wireless communication device acting as a CompN, wherein the capacity update message includes updated distributed computing capacity of the CompN, the distributed computing capacity including one or more of computing resources, memory resources, or communication resources; and in response, update the resource repository based on the capacity update message.

Example 8 includes the subject matter of example 7, wherein the processor is configured to cause the device to receive the capacity update message via a system information block (SIB), a non-access stratum (NAS), radio resource control (RRC) container, or dedicated signaling with the wireless communication device acting as the CompN.

Example 9 includes the subject matter of example 1, wherein the processor is configured to cause the device to assign a process to a selected (CompN), the process corresponding to a distributed computing task having an associated computing resource consumption; and update registration information for the selected CompN in the resource repository based on a computing resource consumption associated with the distributed computing task.

Example 10 includes the subject matter of example 1, wherein the registration information includes a location of the wireless device acting as the OffN or the CompN or a mobility status of the wireless device acting as the OffN or the CompN.

Example 11 includes the subject matter of example 1, wherein the processor is configured to cause the device to generate the resource availability message to indicate one or more available distributed computing resources and, for each distributed computing resource, a CompN associated with the distributed computing resource.

Example 12 includes the subject matter of example 1, wherein the processor is configured to cause the device to transmit the resource availability message via a system information block (SIB), a non-access stratum (NAS), radio resource control (RRC) container, or dedicated signaling with the wireless communication device acting as the OffN or the CompN.

Example 13 includes the subject matter of example 1, wherein the processor is configured to cause the device to transmit the resource availability message periodically, in response to an event, or in response to a request.

Example 14 is a wireless communication device configured to act as a distributed computing offload node (OffN). The wireless communication device includes a memory and a processor coupled to the memory, the processor configured to, when executing instructions stored in the memory, cause the device to transmit a registration message including OffN registration information to a wireless communication device acting as a distributed computing control node (ContN); receive a registration response message from the wireless communication device acting as the ContN, the registration response message indicating an OffN ID; and receive, from the wireless communication device acting as the ContN, a resource availability message indicating available distributed computing resources.

Example 15 includes the subject matter of example 14, wherein the registration message includes an OffN information element or an OffN flag that is set to indicate that the registration message includes OffN registration information.

Example 16 includes the subject matter of example 14, wherein the processor is configured to cause the device to transmit a registration update message to the wireless communication device acting as the ContN, wherein the registration update message includes updated registration information.

Example 17 includes the subject matter of example 14, wherein the registration information includes a location of the device or a mobility status of the wireless communication device.

Example 18 includes the subject matter of example 14, wherein the resource availability message indicates one or more available distributed computing resources and, for each distributed computing resource, a distributed computing compute node (CompN) associated with the distributed computing resource.

Example 19 is a wireless communication device configured to act as a distributed computing compute node (CompN). The wireless communication device includes a memory and a processor coupled to the memory, the processor configured to, when executing instructions stored in the memory, cause the device to transmit a registration message including CompN registration information to a wireless communication device acting as a distributed computing control node (ContN). The CompN registration information includes distributed computing capacity of the wireless communication device, the distributed computing capacity including one or more of computing resources, memory resources, or communication resources. The processor is configured to cause the device to receive a registration response message from the wireless communication device acting as the ContN, the registration response message indicating a CompN ID.

Example 20 includes the subject matter of example 19, wherein the registration message includes a Comp N information element or a CompN flag that is set to indicate that the registration message includes CompN registration information.

Example 21 includes the subject matter of example 19, wherein the processor is configured to cause the device to transmit a registration update message to the wireless communication device acting as the CompN, wherein the registration update message includes updated registration information.

Example 22 includes the subject matter of example 19, wherein the processor is configured to cause the device to transmit a capacity update message to the wireless communication device acting as the ContN, wherein the capacity update message includes updated distributed computing capacity of the CompN.

Example 23 includes the subject matter of example 22, wherein the processor is configured to cause the device to transmit the capacity update message periodically, in response to an event, or in response to a request.

Example 24 includes the subject matter of example 22, wherein the processor is configured to cause the device to transmit the capacity update message via a system information block (SIB), a non-access stratum (NAS), radio resource control (RRC) container, or dedicated signaling with the wireless communication device acting as the OffN or the CompN.

Example 25 includes the subject matter of example 19, wherein the registration information includes a location or a mobility status of the wireless device.

Example 26 is a wireless communication device configured to act as a distributed computing control node (ContN). The wireless communication device includes a memory and a processor coupled to the memory. The processor is configured to, when executing instructions stored in the memory, cause the device to receive an offload request message from a wireless communication device acting as a distributed computing offload node (OffN), wherein the offload request message indicates a distributed computing task and in response to the offload request message, assign a process to a selected wireless communication device acting as a distributed computing compute node (CompN), the process associated with the distributed computing task, and transmit a computation request message to the selected wireless communication device acting as a CompN, the computation request message indicating the distributed computing task. In response to receiving an affirmative computation request response from the selected wireless communication device, the processor is configured to cause the device to transmit an offload request response message to the wireless communication device acting as the OffN, the offload request response message indicating the selected wireless communication device as the CompN for the distributed computing task and record, in a process repository, a CompN ID of the selected wireless communication device and distributed computing resources associated with the distributed computing task mapped to a process ID for the process.

Example 27 includes the subject matter of example 26, wherein the processor is configured to evaluate one or more criteria related to offload request validity, OffN authentication, or link requirements for the distributed computing task; and reject the offload request message and refrain from assigning a process to the distributed compute task when one of the criteria is violated.

Example 28 includes the subject matter of example 27, wherein the one or more criteria include a maximum number of offload requests from a same OffN, a list of approved applications for requesting distributed computing task offload, whether the OffN has a subscription for the distributed computing task, one or more OffN policy criteria, availability of a sufficient quantity of distributed computing resources for the distributed compute task, sufficient radio frequency resource quantity or quality for transferring data associated with the distributed computing task, or latency requirements for the distributed computing task.

Example 29 includes the subject matter of example 26, wherein the offload request message identifies a CompN, further wherein the processor is configured to cause the device to assign the process to the wireless communication device acting as the identified CompN.

Example 30 includes the subject matter of example 26, wherein the offload request message indicates one or more task criteria or an application associated with the distributed computing task, and the processor is configured to cause the device to determine computing resources associated with the distributed computing task based on the one or more task criteria or the application, and select the wireless communication device acting as the CompN based on the determined computing resources.

Example 31 includes the subject matter of example 26, wherein the processor is configured to cause the device to select the wireless communication device acting as CompN based on a CompN designated as a host node for an application associated with the distributed computing task or one or more of a number of collaborating OffNs, a number of computing iterations, a quantity of input data or result data, a precision requirement, a latency requirement, or a level of computing complexity associated with the distributed computing task.

Example 32 includes the subject matter of example 26, wherein the processor is configured to cause the device to when a central processing unit (CPU) speed required by the distributed computing task exceeds a CPU threshold and a graphics processing unit (GPU) speed required by the distributed computing task exceeds a GPU threshold, select, as the wireless communication device acting as the CompN, a wireless communication device designated as a host node for an application associated with the offload request message, when the CPU speed required by the distributed computing task exceeds a CPU threshold and the GPU speed required by the distributed computing task exceeds a GPU threshold, select, as the wireless communication device acting as the CompN, a dedicated distributed computing compute node, when the CPU speed required by the distributed computing task is below the CPU threshold, the GPU speed required by the distributed computing task is below the GPU threshold, and a latency requirement of the distributed computing task is below a latency threshold, select, as the wireless communication device acting as the CompN, a wireless communication device associated with a core network or a radio access network, when the CPU speed required by the distributed computing task is below the CPU threshold, the GPU speed required by the distributed computing task is below the GPU threshold, and an amount of available distributed computing capacity is below a computing capacity threshold, select, as the wireless communication device acting as the CompN, a user equipment device.

Example 33 includes the subject matter of example 26, wherein the processor is configured to cause the device to update registration information for the wireless device acting as the CompN in a resource repository based on a computing resource consumption associated with the distributed computing task.

Example 34 is a wireless communication device configured to act as a distributed computing offload node (OffN). The wireless communication device includes a memory and a processor coupled to the memory, the processor configured to, when executing instructions stored in the memory, cause the device to transmit an offload request message to a wireless communication device acting as a distributed computing control node (ContN), wherein the offload request message indicates a distributed computing task; receive an offload request response message from the wireless communication device acting as the ContN, the offload request response message indicating a selected wireless communication device acting as a distributed computing compute node (CompN) for the distributed computing task; and transmit compute task data to the selected wireless communication device.

Example 35 includes the subject matter of example 34, wherein the processor is configured to cause the device to receive a message from the wireless communication device acting as the ContN, wherein the message indicates available computing resources mapped to CompN identifiers; and select a CompN based on the distributed computing task, wherein the offload request message includes a CompN ID of the selected CompN.

Example 36 includes the subject matter of example 35, wherein the processor is configured to cause the device to select the CompN based on one or more of an application associated with the distributed computing task, a number of collaborating OffNs, a number of computing iterations, a quantity of input data or result data, a precision requirement, a latency requirement, or a level of computing complexity associated with the distributed computing task.

Example 37 includes the subject matter of example 34, wherein the processor is configured to cause the device to when a central processing unit (CPU) speed required by the distributed computing task exceeds a CPU threshold and a graphics processing unit (GPU) speed required by the distributed computing task exceeds a GPU threshold, select, as the wireless communication device acting as the CompN, a wireless communication device designated as a host node for an application associated with the offload request message, when the CPU speed required by the distributed computing task exceeds a CPU threshold and the GPU speed required by the distributed computing task exceeds a GPU threshold, select, as the wireless communication device acting as the CompN, a dedicated distributed computing compute node, when the CPU speed required by the distributed computing task is below the CPU threshold, the GPU speed required by the distributed computing task is below the GPU threshold, and a latency requirement of the distributed computing task is below a latency threshold, select, as the wireless communication device acting as the CompN, a wireless communication device associated with a core network or a radio access network, when the CPU speed required by the distributed computing task is below the CPU threshold, the GPU speed required by the distributed computing task is below the GPU threshold, and an amount of available distributed computing capacity is below a computing capacity threshold, select, as the wireless communication device acting as the CompN, a user equipment device.

Example 38 is a wireless communication device configured to act as a distributed computing compute node (CompN). The wireless communication device includes a memory and a processor coupled to the memory, the processor configured to, when executing instructions stored in the memory, cause the device to receive a computation request message from a wireless communication device acting as a distributed computing control node (ContN), wherein the computation request message indicates a distributed computing task; when the wireless communication device has sufficient computing resources to perform the distributed computing task, transmit an affirmative computation request response to the wireless communication device acting as the ContN; receive compute task data from a wireless communication device acting as a distributed computing offload node (OffN) for the distributed computing task; perform the distributed computing task to generate result data; and transmit the result data to the wireless communication device acting as the OffN.

Example 39 includes the subject matter of example 38, wherein the processor is configured to cause the device to transmit a capacity update message to the wireless communication device acting as ContN, the capacity update message indicating available computing resources remaining based on computing resources associated with the distributed computing task.

Example 40 includes the subject matter of example 39, wherein the processor is configured to cause the device to transmit the capacity update message via a system information block (SIB), non-access stratum (NAS), radio resource control (RRC) container, or dedicated signaling with the wireless communication device acting as the ContN.

Example 41 includes the subject matter of example 39, wherein the processor is configured to cause the device to transmit the capacity update message periodically, in response to an event, or in response to a request.

Example 42 is an apparatus including the memory and processor of UE any of examples 1-41.

Example 43 is a method including performing functions performed by the wireless communication device of any of examples 1-41.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases. In some embodiments, the methods illustrated above may be implemented in a computer readable medium using instructions stored in a memory. Many other embodiments and variations are possible within the scope of the claimed disclosure.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A wireless communication device configured to act as a distributed computing control node (ContN), the wireless communication device comprising a memory and a processor coupled to the memory, the processor configured to, when executing instructions stored in the memory, cause the wireless communication device to:

receive a registration message from a second wireless communication device, the registration message including registration information indicating whether the second wireless communication device acts as an offload node (OffN) for distributed computing or a compute node (CompN) for distributed computing;

in response to the registration message, assign an OffN identifier (ID) or a CompN ID to the second wireless communication device, generate a mapping of the registration information of the second wireless communication device to the OffN ID or the CompN ID; and based on the mapping, transmit a resource availability message indicating available distributed computing resources to wireless communication devices acting as OffNs.

2. The wireless communication device of claim 1, wherein the registration message comprises an OffN information element or an OffN flag that is set to indicate that the respective wireless communication device acts as an OffN for distributed computing and a CompN information element or a CompN flag that is set to indicate that the respective wireless communication device acts as a CompN for distributed computing.

3. The wireless communication device of claim 1, wherein the processor is configured to cause the wireless communication device to in response to receiving the registration message from the second wireless communication device, when the registration information indicates that the second wireless communication device acts as an OffN for distributed computing, generate the mapping by creating a record in a resource repository that maps the registration information of the second wireless communication device to the OffN ID, transmit a registration response message to the second wireless communication device indicating an OffN ID; and when the registration information indicates that the second wireless communication device acts as a CompN for distributed computing, generate the mapping by creating a record in the resource repository that maps the registration information of the second wireless communication device to the CompN ID, and transmit a registration response message to the second wireless communication device indicating a CompN ID.

4. The wireless communication device of claim 1, wherein the OffN ID or the CompN ID comprises a global unique temporary identifier, a subscriber concealed identifier, or a network function identifier assigned to the second wireless communication device.

5. The wireless communication device of claim 1, wherein the processor is configured to cause the wireless communication device to receive a registration update message from a third wireless communication device acting as an OffN or a CompN, wherein the registration update message comprises updated registration information; and in response, update the mapping based on the updated registration information.

6. The wireless communication device of claim 1, wherein the processor is configured to cause the wireless communication device to receive an offload request message for a distributed computing task from a fourth wireless communication device acting as an OffN, wherein the offload request message indicates a latency or quality of service (QOS) requirement for the distributed computing task;

in response, select a CompN for the distributed computing task based on the latency or QoS requirement; and transmit an offload request response message that indicates the CompN to the wireless device acting as an OffN.

7. The wireless communication device of claim 1, wherein the processor is configured to cause the wireless communication device to receive a capacity update message from a fifth wireless communication device acting as a CompN, wherein the capacity update message comprises updated distributed computing capacity of the CompN, the distributed computing capacity including one or more of computing resources, memory resources, or communication resources; and in response, update the mapping based on the capacity update message.

8. The wireless communication device of claim 7, wherein the processor is configured to cause the wireless communication device to receive the capacity update message via a system information block (SIB), a non-access stratum (NAS), radio resource control (RRC) container, or dedicated signaling with the wireless communication device acting as the CompN.

9. The wireless communication device of claim 1, wherein the processor is configured to cause the wireless communication device to assign a process to a selected (CompN), the process corresponding to a distributed computing task having an associated computing resource consumption; and update registration information for the selected CompN in the mapping based on a computing resource consumption associated with the distributed computing task.

10. The wireless communication device of claim 1, wherein the registration information includes a location of the second wireless communication device acting as the OffN or the CompN or a mobility status of the wireless communication device acting as the OffN or the CompN.

11. The wireless communication device of claim 1, wherein the processor is configured to cause the wireless communication device to generate the resource availability message to indicate one or more available distributed computing resources and, for each distributed computing resource, a CompN associated with the distributed computing resource.

12. The wireless communication device of claim 1, wherein the processor is configured to cause the wireless communication device to transmit the resource availability message via dedicated signaling with the second wireless communication device acting as the OffN or the CompN.

13. The wireless communication device of claim 1, wherein the processor is configured to cause the wireless communication device to transmit the resource availability message periodically, in response to an event, or in response to a request.

14. A wireless communication device configured to act as a distributed computing offload node (OffN) that offloads distributed computing tasks to distributed computing resources, the wireless communication device comprising a memory and a processor coupled to the memory, the processor configured to, when executing instructions stored in the memory, cause the wireless communication device to:

transmit a registration message comprising OffN registration information to a wireless communication device acting as a distributed computing control node (ContN);

receive a registration response message from the wireless communication device acting as the ContN, the registration response message indicating an OffN ID; and receive, from the wireless communication device acting as the ContN, a resource availability message indicating available distributed computing resources.

15. The wireless communication device of claim 14, wherein the processor is configured to cause the wireless communication device to receive the resource availability message by way of a multicast or unicast message.

16. The wireless communication device of claim 14, wherein the processor is configured to cause the wireless communication device to transmit an offload request message to the wireless communication device acting as the ContN, the request message indicating a distributed computing task and the OffN ID assigned by the registration response message.

17. The wireless communication device of claim 14, wherein the registration information includes a location of the wireless communication device or a mobility status of the wireless communication device.

18. The wireless communication device of claim 16, wherein the offload request message indicates a latency or quality of service (Qos) requirement for the distributing computing task.

19. A wireless communication device configured to act as a distributed computing compute node (CompN), the wireless communication device comprising a memory and a processor coupled to the memory, the processor configured to, when executing instructions stored in the memory, cause the wireless communication device to:

transmit a registration message comprising CompN registration information to a wireless communication device acting as a distributed computing control node (ContN), wherein the CompN registration information includes distributed computing capacity of the wireless communication device, the distributed computing capacity including one or more of computing resources, memory resources, or communication resources;

receive a registration response message from the wireless communication device acting as the ContN, the registration response message indicating a CompN ID;

receive a computation request message indicating a distributed computing task; and in response to the computation request message, transmitting, to the wireless device acting as a ContN, a first capacity update message that indicates, based on the distributed computing task, remaining available computing resources.

20. The wireless communication device of claim 19, wherein the processor is configured to cause the wireless communication device to transmit a second capacity update message in response to completing the distributed computing task, wherein the subsequent capacity update message indicates, based on the completion of the distributed computing task, remaining available computing resources.

21. The wireless communication device of claim 19, wherein the processor is configured to cause the wireless communication device to transmit a registration update message to the wireless communication device acting as the CompN, wherein the registration update message comprises updated registration information.

22. The wireless communication device of claim 19, wherein the processor is configured to cause the wireless communication device to transmit a third capacity update message periodically or in response to an event.

23. The wireless communication device of claim 19, wherein the processor is configured to cause the wireless communication device to transmit the first capacity update message via a system information block (SIB), a non-access stratum (NAS), radio resource control (RRC) container, or dedicated signaling with the wireless communication device acting as the OffN or the CompN.

24. The wireless communication device of claim 19, wherein the registration information includes a location or a mobility status of the wireless communication device.

* * * * *